United States Patent [19]

Marsi

[11] Patent Number: 5,076,589
[45] Date of Patent: Dec. 31, 1991

[54] MECHANICAL SEAL

[75] Inventor: Joseph A. Marsi, Rancho Palos Verdes, Calif.

[73] Assignee: BW/IP International, Inc., Long Beach, Calif.

[21] Appl. No.: 488,238

[22] Filed: Mar. 1, 1990

[51] Int. Cl.$^5$ .............................................. F16J 15/38
[52] U.S. Cl. .................................... 277/3; 277/29; 277/41; 277/65; 277/70; 277/72 R; 277/81 R; 277/87; 277/202; 277/206 A
[58] Field of Search ...................... 277/3, 27, 15, 81 R, 277/29, 201, 202, 65, 70, 206 A, 30, 72 R, 85, 87

[56] References Cited

U.S. PATENT DOCUMENTS

| | | | |
|---|---|---|---|
| 2,628,852 | 2/1953 | Voytech | 277/81 X |
| 2,824,759 | 2/1958 | Tracy | 277/15 |
| 2,836,440 | 5/1958 | Brumagim | 277/81 X |
| 2,983,533 | 5/1961 | Tisch | 277/206 X |
| 3,068,012 | 12/1962 | Van Vleet | 277/27 |
| 3,360,272 | 12/1967 | Blom et al. | 277/3 |
| 3,526,408 | 9/1970 | Tracy | 277/74 X |
| 3,813,103 | 5/1974 | Wiese | 277/74 X |
| 4,272,084 | 6/1981 | Martinson | 277/30 |
| 4,475,736 | 10/1984 | Lesiecks | 277/3 |
| 4,586,719 | 5/1986 | Marsi et al. | 277/81 RX |

FOREIGN PATENT DOCUMENTS 762232  11/1956  United Kingdom ........... 277/206 X Primary Examiner—Allan N. Shoap
Attorney, Agent, or Firm—Aubrey L. Burgess; Joseph R. Dwyer

[57]     ABSTRACT

An improved mechanical seal assembly for separating high pressure fluid from lower pressure fluid including a vented Quad-ring in a non-rotatable seal ring for providing lower sliding friction and improved, more consistent pressure deflection of the non-rotating seal face, an improved means for positioning a pressure breakdown means located in the high pressure fluid for controlling the pressure differential between the high pressure fluid and the low pressure fluid by a predetermined amount and means for improving the circulation of clean fluid around the outer periphery of the seal assembly under conditions where the fluid being pumped is contaminated.

7 Claims, 4 Drawing Sheets

MECHANICAL SEAL

BACKGROUND OF THE INVENTION

This invention relates to improvements in high pressure mechanical seal assemblies to prevent uncontrolled leakage of high pressure fluid along a rotating shaft and is particularly directed to an improvement in a mechanical seal assembly such as disclosed in the U.S. Pat. No. 4,586,719 patent of Marsi et al, which issued on May 6, 1986.

As stated in the Marsi et al patent, the patented mechanical seal assembly was developed for use in nuclear reactor coolant pumps, boiler recirculator pumps and pipeline pumps to meet the requirements for extreme and widely changing conditions of pressures and temperatures, where the pump shaft will move axially and may also wobble or deflect radially under such conditions. To operate under such conditions, the patented mechanical seal assembly has a rotatable seal ring resiliently coupled to a rotatable shaft and a non-rotatable seal ring resiliently urged axially toward the rotatable seal ring by axially-arranged identical springs received in spring pockets in a spring retainer. The seal rings separate high pressure fluid from a lower pressure fluid, and have opposed seal faces lubricated by the pump fluid. The outer surface of the rotatable seal ring is enclosed within and is resiliently coupled to an encircling cylindrical member and the non-rotatable seal ring is sealed inside another encircling cylindrical member. A balance sleeve, loosely fitted in the seal flange, supports the non-rotatable seal ring and allows angular misalignment between the shaft and balance sleeve during operation of the seal assembly.

SUMMARY OF THE INVENTION

The mechanical seal assembly of this invention is used for separating high pressure fluid from a lower pressure fluid and contains all of the improvements in the mechanical seal assembly disclosed in the aforesaid patent and is further improved by including a vented X-ring (also called a vented Quad-ring) in the non-rotatable seal ring for providing lower sliding friction and improved, more consistent, pressure deflection of the non-rotatable seal face, and improved means for positioning a pressure breakdown means in the seal assembly for reducing the pressure by a ratio of one half between the high pressure side and the low pressure side. As a further improvement, under conditions where fluid being pumped is contaminated and may interfere with the operation of the seal assembly, means are provided for improving circulation of clean fluid around the outer periphery of the seal assembly.

DETAILED DESCRIPTION

Figure 1:
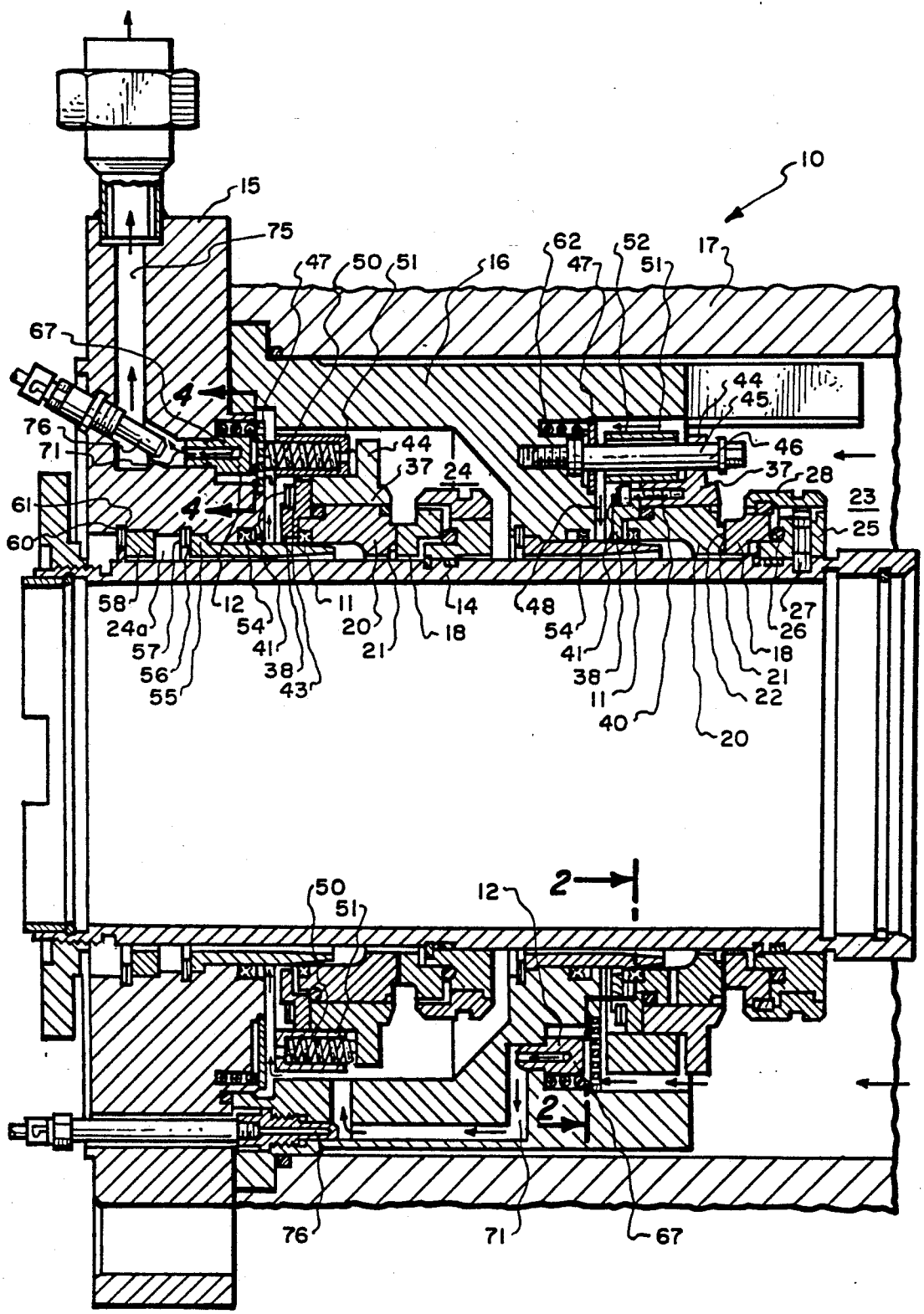
FIG. 1 is a cross-sectional view through the seal assembly constructed in accordance with the teachings of this invention.

FIG. 1 illustrates a multiple stage mechanical seal assembly with substantially identical stages with some of the parts common to both stages more clearly illustrated in one or the other of the stages to simplify the drawings, and to shorten and simplify the description herein, identical reference numerals will be used in both stages to identify identical parts which function in the same manner as the parts in the described stage. Also, the terms "mechanical seal assembly" and "seal assembly" are used interchangeably. It should also be understood that while two stages are disclosed, other stages may be added where necessary and that these improvements may be used in a single stage seal assembly as well. Finally, while these improvements are disclosed in connection with the patented seal assembly, it should be apparent to those skilled in the art that these improvements may be used on other seal assemblies.

Thus in FIG. 1, stage 1 of the improved mechanical seal assembly is also identified in its entirety as 10 and includes the aforementioned Quad-ring, identified as 11, more clearly illustrated in FIG. 3, the aforementioned pressure breakdown means, identified in its entirety as 12, more clearly illustrated in FIGS. 4 and 5, and the aforementioned improved clean fluid circulating means 13, more clearly illustrated in FIGS. 8-10, all of which will be described in more detail.

The aforesaid patent describes the seal assembly in more detail without the present invention, but sufficient details of the patented seal assembly are described and shown herein for a full understanding of the invention.

The seal assembly 10 is shown on a rotatable shaft sleeve 14 with a non-rotatable seal housing comprising a seal flange 15 and a seal housing 16, all within a pump housing only partially shown at 17.

The seal assembly 10 comprises the shaft sleeve 14, a rotatable seal ring 18 and a non-rotatable seal ring 20 which is resiliently urged toward the rotatable seal ring 20. Seal rings 18 and 20 have relatively rotating opposed and lapped seal faces 21 and 22 which substantially prevent the flow of high pressure fluid from the high pressure zone 23 to a lower pressure zone 24. The low pressure zone 24 is also the high pressure zone of stage 2 and may sometimes be referred to as an intermediate pressure zone. The low pressure zone in stage 2 is identified as 24a.

Rotatable seal ring 18 cooperates with an adapter 25 and an O-ring 26 therebetween to seal and space the rotatable seal ring 18 from the adapter 25 to avoid undesirable affects of different radial deflections of rotatable seal ring 18 and adapter 25 under operating conditions due to difference in material from which they are made. Drive pins 27 in adapter 25 and in shaft sleeve 14 form a driving connection between shaft sleeve 14 and adapter 25.

Figure 7:
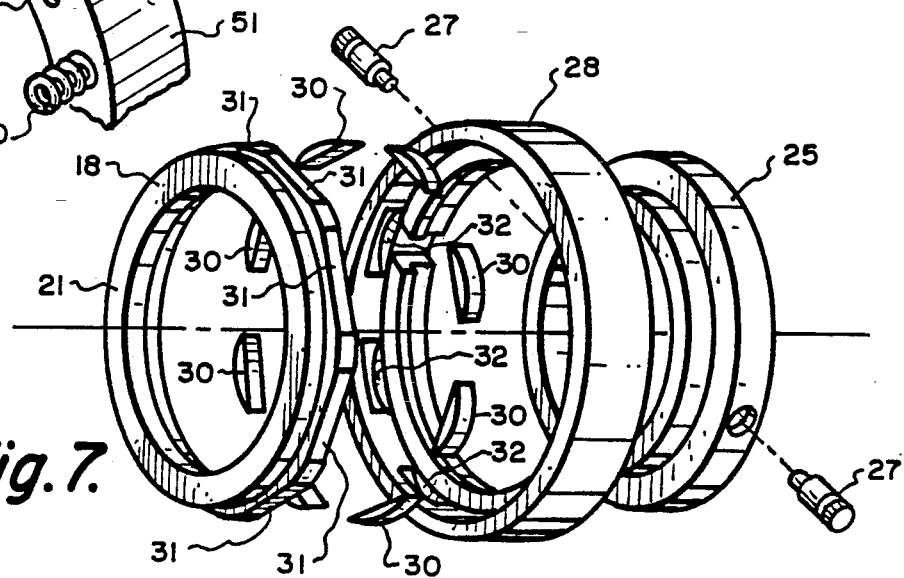
FIG. 7 is an exploded view of the rotatable sealing ring, lock ring and the means for providing a resilient connection therebetween.

As shown in FIGS. 1 and 7, a lock ring 28, previously referred to as a "cylindrical member", encircles the adapter 25 and rotatable seal ring 18 and is connected thereto by elastomeric keys 30 received in transverse pockets defined by flats 31 on the rotatable seal ring 18 and grooves 32 in the lock ring 28. Rotatable seal ring 18 is driven by lock ring 28 operating through drive pins 27 extending into shaft sleeve 14. Keys 30 provide a resilient driving connection between a lock ring 28 and rotatable seal ring 18 and cushion the drive therebetween.

The elastomeric keys 30 exert radially inwardly directed forces on the rotatable seal ring 18 and when the frictional forces between the seal faces 21 and 22 increase, the keys 30 exert increased forces on the rotatable seal ring 18 to cause the face 21 to distort and deflect in a wavy pattern permitting increased fluid flow across the seal faces 21 and 22 with a reduction of the friction therebetween. As torque increases, deflection of the seal face 21 increases so that the seal is self compensating.

Figure 3:
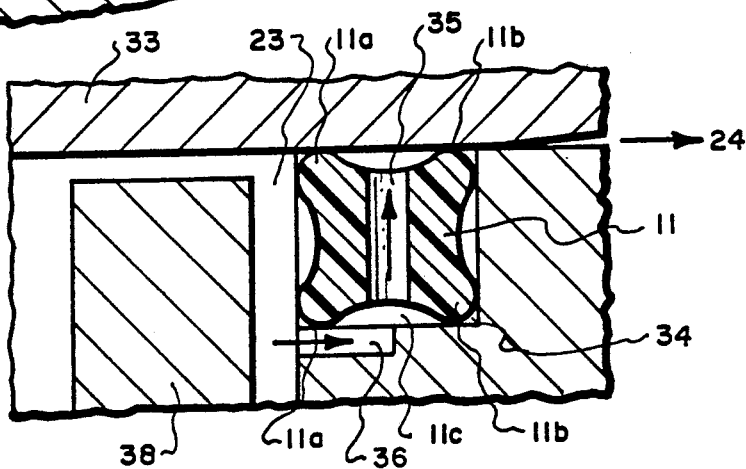
FIG. 3 is a cross-sectional view of the Quad-ring, taken along line 3—3 of FIG. 2 and enlarged for clarity.
Figure 4:
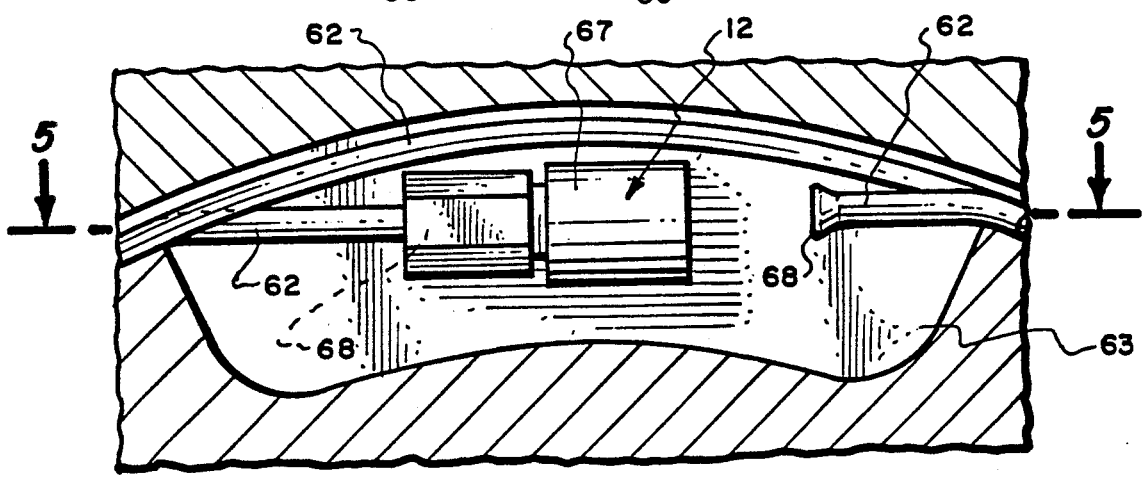
FIG. 4 shows a fitting and entrance of the pressure breakdown means, taken along 4—4 of FIG. 1, and enlarged for clarity.

As more clearly shown in FIG. 3, non-rotatable seal ring 20 is centered on balance sleeve 33 by the Quadring 11, positioned between the non-rotatable seal ring 20 and balance sleeve 33 and in a gland 34 in the non-rotatable seal ring 20. This Quad-ring 11 permits axial movement of non-rotatable seal ring 20 relative to balance sleeve 33 and prevents undesirable deflections of non-rotatable seal ring 20.

In the patented seal assembly, an O-ring was located in gland 34, but the replacement of the O-ring with the vented Quad-ring 11 improved this seal assembly by providing lower sliding friction between the non-rotatable seal ring 20 and the balance sleeve 33. Quad-ring 11 also provides better and more consistent deflection of the seal face 22. To accomplish these improvements, the Quad-ring 11 has a plurality of radial vent passageways 35 between forward lobes 11a and rear lobes 11b, and the gland or annular groove 34 is provided with a plurality of short axial slots 36 (only one shown) to allow high pressure fluid to fill space 11c between the lobes. In this way, the pump fluid helps lubricate the Quad-ring and the forward lobes 11a act as wipers while the rear lobes form a seal. With the high pressure in space 11c there is provided a uniform predictable pressure between the lobes 11a and 11b; otherwise, the unpredictable fluid pressure between the lobes would cause unpredictable distortions of the rotatable ring seal face 22.

The outer circumference of non-rotatable seal ring 20 is encircled and sealed to a retainer 37, previously referred to as a "cylindrical member", and an annular flange member 38 is attached to the retainer 37 by cap screws 40. Also, to prevent retraction of the cap screws 40 during operation, the annular flange member 38 has a spring ring 41 covering the cap screws 40 and is disposed in a slot 43. Retainer 37 substantially eliminates severe radial reflections of non-rotatable seal ring 20 which could be caused by extreme pressure differentials in the inside and outside of non-rotatable seal ring 20. The retainer 37 has a radially outwardly extending flange 44 with a plurality of openings 45 (only one being shown) to receive lock bolts 46 (only one being shown) which extend through a thin flat strainer 47 (see FIG. 2) and are threaded into an inwardly directed radial wall 48 of the seal housing 16 and prevent rotation of the non-rotatable seal ring 20. Since the openings 45 are larger than the diameter of the lock bolts 46, the non-rotatable seal ring 20 is free to move axially toward the rotatable seal ring 18. As shown in FIGS. 1 and 5, the flange 44 is engaged by a plurality of identical coil springs 50 located in a spring retainer 51. A plurality of coil springs 50 also engage the strainer 47. These coil springs urge the non-rotatable seal ring 20, through the spring retainer 51, toward the rotatable seal ring 18. To prevent rotation of the spring retainer 51, bolts 46 also extend through holes 52 in the spring retainer 51. Holes 52 are large enough to allow the spring retainer 51 to move axially.

Figure 5:
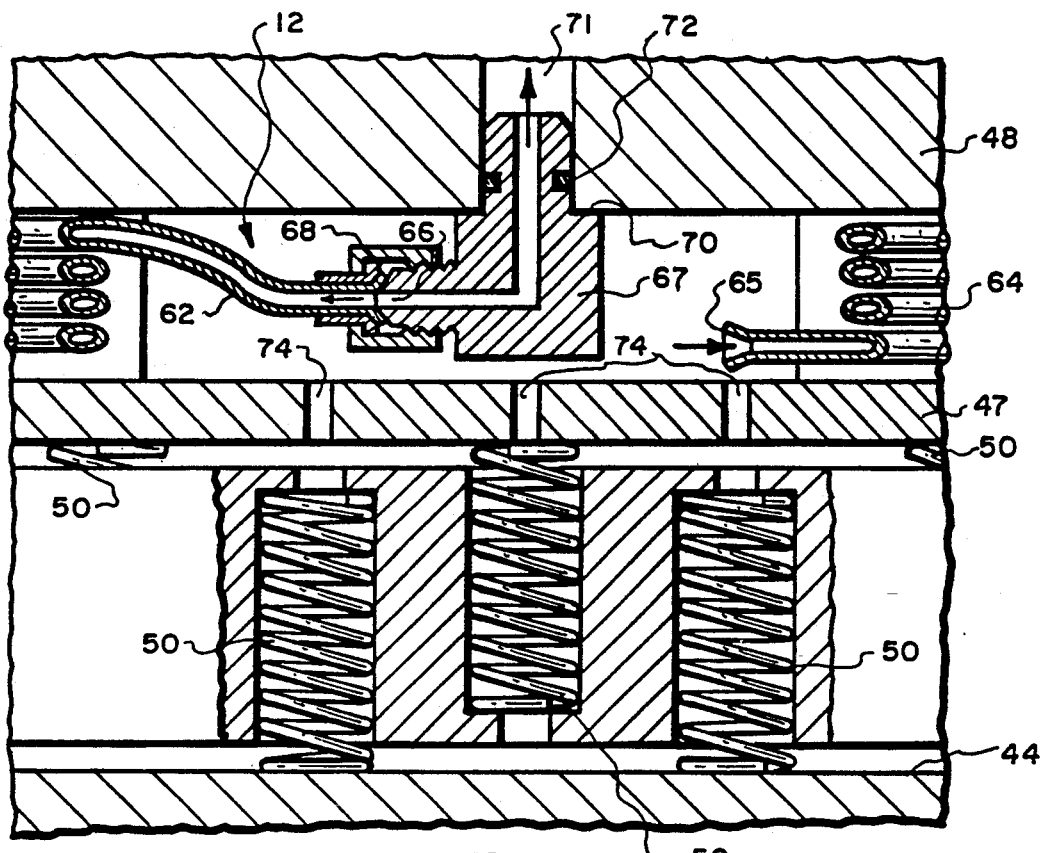
FIG. 5 is a cross-sectional view, taken along line 5—5 of FIG. 4, showing the fitting of the pressure breakdown means and the springs which urge the stationary seal rings toward the rotatable seal ring.
Figure 6:
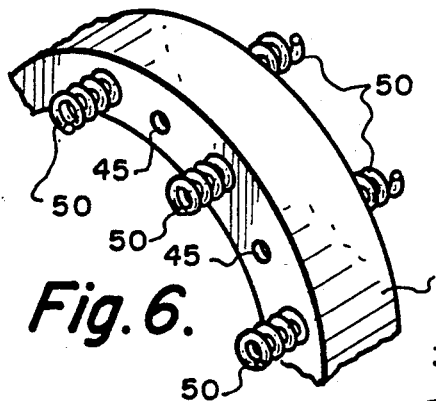
FIG. 6 is a partial perspective illustration of a spring retainer ring with spring pockets and springs in some of the pockets.

As shown in FIGS. 1 and 5, these coil springs 50 are located in pockets 53 in the spring retainer 51. The spring retainer 51 is positioned so that some of its pockets 51 open toward the wall 48 while others open toward the seal face 22. As explained in the aforementioned patent, the springs 50 are arranged in groups of spring sets which provide a substantially uniform spring load on the non-rotatable seal ring 20 under all operating conditions and permits twice the axial movement of the shaft sleeve 14 compared to more conventional spring arrangements wherein the springs are all facing in one direction.

An X-ring 54 is positioned between the balance sleeve 33 and seal flange 15. The balance sleeve 33 has a radially outwardly extending flange 55 which seats in a groove 56 and engages a position ring 57 to axially position the balance sleeve 33. A bushing 58 engages a position ring 60 located in a groove 61 in seal flange 15 and is spaced axially from the balance sleeve 33 forming the outer end of the low pressure zone 24a.

X-ring 54 provides a hydraulic seal between balance sleeve 33 and seal flange 15 and shaft wobble or misalignment will not affect the alignments of the non-rotatable seal 20 and its associated parts.

Non-rotatable seal ring 20 is preferably made of carbon and rotatable seal ring 18 is preferably made of a harder material, such as titanium carbide, tungsten carbide, silicon carbide and the like. The remainder of the assembly, except for the elastomeric rings and keys, are generally made of a suitable metal depending upon the environment in which the seal assembly is to be used.

Having described one of the improvements, i.e., the vented Quad-ring 11 and how it functions, the second improvement, the improved manner of positioning the pressure breakdown means 12, will now be described.

Figure 2:
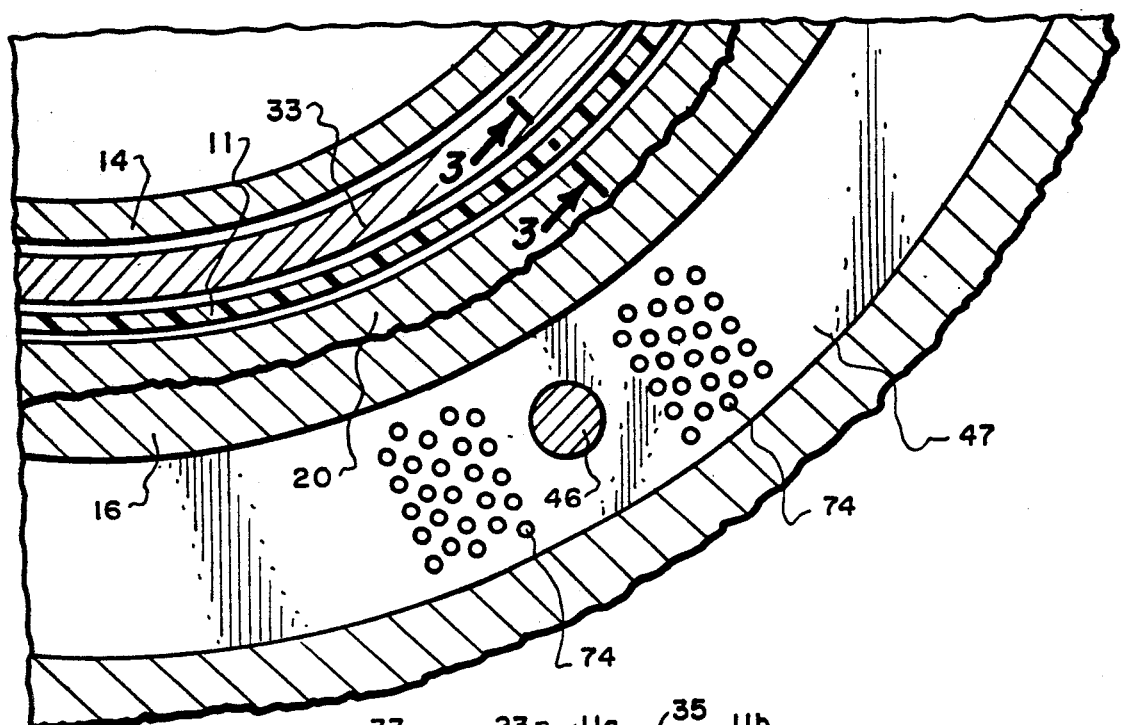
FIG. 2 is a cross-sectional view of a strainer ring, taken along line 2—2 of FIG. 1 and enlarged for clarity.

Thus, attention is now directed to the retainer 47 in the radial wall 48 as shown in FIGS. 1, 2 and 5. The radial wall 48 has a thin groove 62 which opens into a cavity 63 and positioned within the groove 62 is a coiled hollow tube 64 which has an open entrance end 65 and terminates at an open exit end 66 within a fitting 67. This fitting 67 is provided with a conventional means for attaching a tubing to a fitting, as by a flared end on the tubing and nut, both of which are identified as 68. The fitting 67 has a shoulder 70 which engages wall 48 of the seal housing 16, extends into an outlet passage 71 (partially shown in FIG. 5) and is sealed against leakage between the high pressure zone 23 and passage 71 by O-ring 72. The strainer 47 has a plurality of holes 74 to open the groove 62 and cavity 63 to the high pressure zone 23. In this manner, high pressure fluid enters the tubing 64 and flows several times around the seal housing 16 and out the fitting 67 and into passage 71 in the seal housing 16. Passage 71 opens into the low pressure zone 24. In stage 2, the passage 71 opens into an outlet passage 75. Suitable temperature sensors 76 continually monitor the temperature of the flow of fluid in the passages 71 and 75.

Thus, the pressure breakdown means is a means of reducing the pressure by one half between the high pressure zone 23 and the lower pressure zone 24 and between the lower pressure zone and the final or zero pressure zone 24a by a controlled leakage determined by the size of the tubing. As for example, if the pressure in stage 1 were 1,000 psi, the pressure in stage 2 is controlled to equal 500 psi in the lower pressure zone 23 of stage 2 and the pressure in the final low pressure zone, such as 24a, is controlled to be 0 psi. This pressure control, of course, results in a minor loss of fluid but the advantages to the control of the pressure in the various zones is apparent. While two pressure breakdown means are shown, additional such means may be used depending upon the number of stages.

Figure 8:
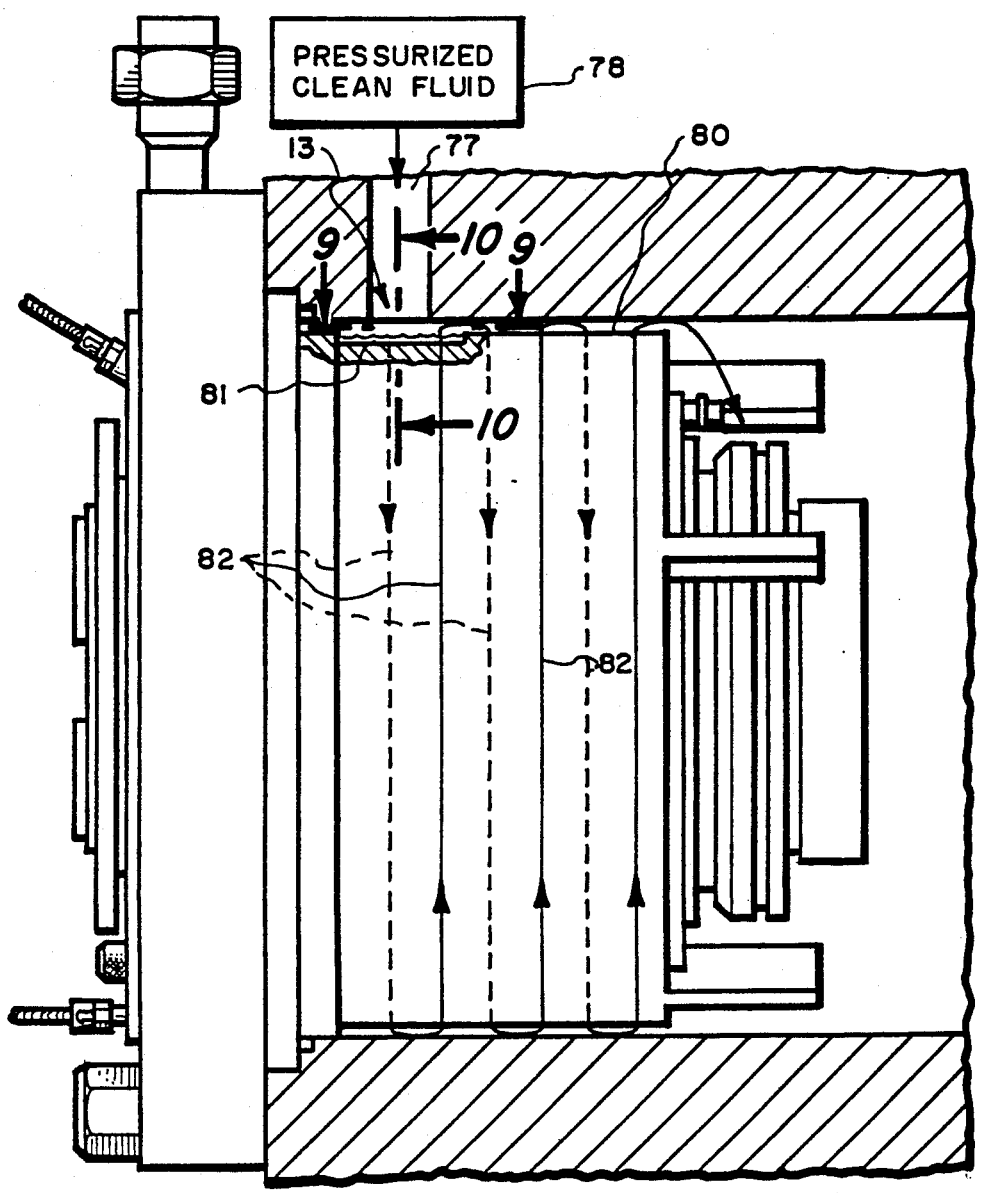
FIG. 8 is a cross-sectional view of part of the pump housing and seal assembly illustrating the means for improving circulation of clean fluid around the seal assembly.
Figure 9:
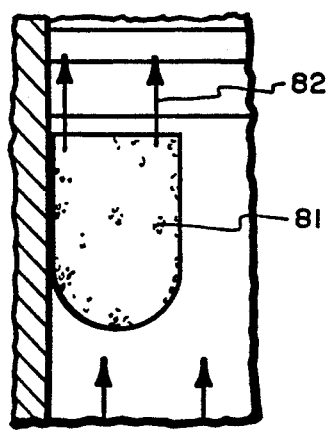
FIG. 9 is a view of the means of improving the circulation of clean fluid, taken along line 9—9 of FIG. 8, and enlarged for clarity.
Figure 10:
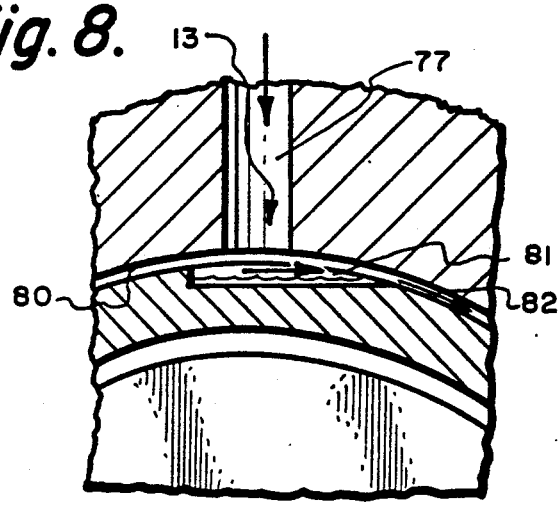
FIG. 10 is another view of the means for improving the circulation of clean fluid, taken along line 10—10 of FIG. 8, and enlarged for clarity.

The third improvement of this seal assembly 10, i.e., the clean fluid circulating means 13, is more clearly shown in FIGS. 8-10 and comprises a radial passage 77 in the pump housing 17 connecting a source of clean fluid under pressure, block diagram 78, to the outer periphery of the seal housing 16 having a space 80 between the seal flange 16 and the pump housing 17 where the clean fluid will circulate tangentially of the seal housing 16 and into the high pressure zone 23. This clean fluid is used when the pump fluid is contaminated and may damage the seal assembly 10. To facilitate the tangential flow of fluid, the outer surface of the seal housing 16 is provided with a slot 81 which directs the radial flow of the clean fluid tangentially of the seal housing 16 as represented by arrows 82.

I claim:

1. In a mechanical seal assembly for separating a high pressure fluid and a lower pressure fluid, and associated with a rotatable shaft and a stationary housing, said assembly comprising:
   a rotatable seal ring connected to said shaft,
   a non-rotatable seal ring connected to said housing for limited axial movement,
   means for urging said non-rotatable seal ring axially toward said rotatable seal ring,
   the improvement comprising,
   sealing means of the X-ring type, said sealing means having frontal lobes and rear lobes with said frontal lobes facing the high pressure fluid, said sealing means being located between said rotatable shaft and said non-rotatable ring, vent passage means between said frontal and rear lobes so that both said frontal and rear lobes are subjected to high pressure thus providing a uniform predictable pressure between said frontal lobes and rear lobes for improving the sliding friction of said sealing means with respect to said rotatable shaft and for more consistent deflection of the non-rotatable sealing ring.

2. The mechanical seal assembly of claim 1 further including a pressure breakdown means comprising a fitting held in place by said high pressure fluid and a coil having an entrance end in the high pressure fluid and an exit end in said fitting for the flow of a limited amount of fluid between the high pressure fluid and the lower pressure fluid for controlling the difference in pressure between the high pressure fluid and lower pressure fluid by a ratio of one half the pressure difference.

3. The mechanical seal assembly of claim 1 further including means for improving the circulation of clean fluid from a source of pressurized clean fluid around the periphery of said seal assembly.

4. A self-compensating mechanical seal assembly for separating a high pressure fluid and a lower pressure fluid, and assocated with a rotatable shaft, a balance sleeve and a stationary housing, said assembly comprising,
   a rotatable seal ring connected to said shaft;
   a non-rotatable seal ring connected to said housing for limited axial movement and supported by said balance sleeve,
   a seal face on each seal ring with one opposing the other,
   means urging the non-rotatable seal ring toward the rotatable seal ring, and
   means sealing the non-rotatable seal ring with respect to said balance sleeve comprising an elastomeric ring having a plurality of spaced apart lobes defining a space therebetween some of which lobes are subjected to high pressure fluid, and means between said lobes communicating with said high pressure fluid for providing the space between said lobes with high pressure fluid.

5. The mechanical seal assembly of claim 4 further including a pressure breakdown means comprising a fitting in said high pressure fluid and a coil having an entrance end opening into said high pressure fluid and an exit end in said fitting and located in said lower pressure fluid for controlling the pressure of said low pressure fluid.

6. The mechanical seal assembly of claim 5 including a source of pressurized clean fluid, means directing clean fluid from said pressurized source radially onto said seal assembly and means directing said radially directed clean fluid tangentially around said seal assembly to provide the seal assembly with clean fluid in said high pressure fluid area and reduce contamination of said seal assembly.

7. A self-compensating mechanical seal assembly for separating a high pressure fluid and a lower pressure fluid, and associated with a rotatable shaft, and a stationary housing, said assembly comprising,
   a rotatable seal ring connected to said shaft;
   a non-rotatable seal ring connected to said housing and capable of axial movement,
   a seal face on each seal ring with one opposing the other,
   means urging the non-rotatable seal ring toward the rotatable seal ring, and
   means sealing the non-rotatable seal ring with respect to said lower pressure fluid comprising an elastomeric ring having a plurality of spaced apart lobes some of which are subjected to high pressure fluid, and means between said lobes for providing the space between said lobes with high pressure fluid,
   a pressure breakdown means comprising a fitting in said high pressure fluid and held in place thereby and a coil having an entrance end opening into said high pressure fluid and an exit end located in said fitting and in said lower pressure fluid for controlling the pressure of said low pressure fluid,
   a source of pressurized clean fluid, and
   means directing clean fluid from said pressurized source radially onto said seal assembly and means directing said radially directed clean fluid tangentially around said seal assembly to provide the seal assembly with clean fluid in said high pressure fluid area and reduce contamination of said seal assembly.

* * * * *

UNITED STATES PATENT AND TRADEMARK OFFICE
CERTIFICATE OF CORRECTION

PATENT NO. : 5,076,589

DATED : 12/31/91

INVENTOR(S) : Joseph A. Marsi

It is certified that error appears in the above-identified patent and that said Letters Patent is hereby corrected as shown below:

In column 3, line 45, delete "or annular groove";

In column 3, line 49, delete "the forward lobes 11a act as wipers while the rear" and insert therefor --the rear lobes 11a act as wipers while the forward--.

Signed and Sealed this

Eleventh Day of May, 1993

Attest:

MICHAEL K. KIRK

*Attesting Officer*     *Acting Commissioner of Patents and Trademarks*